(12) United States Patent
Nikom

(10) Patent No.: US 6,452,587 B1
(45) Date of Patent: Sep. 17, 2002

(54) CURSOR CONTROLLER USING SPEED POSITION

(75) Inventor: Jacob S. Nikom, Needham, MA (US)

(73) Assignee: Mitsubishi Electric Research Laboratories, Inc, Cambridge, MA (US)

(*) Notice: Subject to any disclaimer, the term of this patent is extended or adjusted under 35 U.S.C. 154(b) by 0 days.

(21) Appl. No.: 09/481,021

(22) Filed: Jan. 11, 2000

(51) Int. Cl.[7] ................................................. G09G 5/08
(52) U.S. Cl. ........................................ 345/167; 345/161
(58) Field of Search .................................. 345/161, 164, 345/167, 173, 145, 146, 157, 160, 163; 74/371

(56) References Cited

U.S. PATENT DOCUMENTS

| 4,418,014 A | 4/1979 | Burson | 340/709 |
|---|---|---|---|
| 5,063,289 A | 11/1991 | Jasinski et al. | 250/221 |
| 5,280,276 A | 1/1994 | Kwok | 345/167 |
| 5,726,684 A | 3/1998 | Blankenship et al. | 345/167 |
| 5,784,052 A | 7/1998 | Keyson | 345/167 |
| 5,880,717 A | 3/1999 | Chan et al. | 345/173 |
| 5,995,104 A | * 11/1999 | Kataoka et al. | 345/145 |
| 6,031,518 A | * 2/2000 | Adams et al. | 345/156 |
| 6,147,679 A | * 11/2000 | Numata et al. | 345/163 |
| 6,184,869 B1 | * 2/2001 | Harding et al. | 345/163 |

* cited by examiner

*Primary Examiner*—Richard Hjerpe
*Assistant Examiner*—Ronald Laneau
(74) *Attorney, Agent, or Firm*—Dirk Brinkman; Andrew Curtin

(57) ABSTRACT

An input device for controlling cursor movement on a display screen includes a first controller configured to control cursor direction and a cursor speed. A second controller mounted on the first controller is configured to control cursor x-y position. The first input controller can be used for fast coarse movement of the cursor, and the second controller for fine movement after the approximate desired position is reached using the first controller. Switch for fast and easy switching between two modes creating the feeling of controlling first and second controllers simultaneously.

7 Claims, 2 Drawing Sheets

CURSOR CONTROLLER USING SPEED POSITION

FIELD OF THE INVENTION

The present invention relates generally to a method and apparatus for inputting data to a computer system, and more particularly to a device for moving a cursor on a display screen.

BACKGROUND OF THE INVENTION

The size of computer display screens is getting larger with each new generation of product offerings. Not so long ago, a 9-inch monitor was the norm. Now, 21-inch monitors are found on the desks of many users. With the introduction of large-scale flat panel monitors, it is anticipated that even larger screens will soon become common.

Increasing the size of the display screen leads to longer paths that the cursor needs to move from a current position to a desired new position. However the speed of cursor movement has not increased with the size of display screens. Consequently, users who work with larger display screens have to spend more time and effort moving the cursor on the screen.

Currently, there are two methods for moving a cursor. In one method, the user displaces the input device itself. For example, a mouse is displaced on a desk-top, or a pen is displaced on a tablet. Alternatively, some part of the input device, for example, a trackball is displaced. Here, the movement of the cursor on the display screen is strictly proportional to the displacement of the user input device.

In another method, the cursor's movement is proportional to the displacement of the input device and other displacement parameters such as velocity or acceleration parameters. The parameters can be constant or variable. To move the cursor, the user displaces the device, for example, a joystick, or some part of the input device from an initial position and keeps this displacement relatively constant for a specific amount of time. The cursor moves in the direction of this displacement with a speed proportional to the current displacement of the input device until a desired position is reached. After the cursor reaches the desired position, the user restores the device back to its initial state which stops cursor movement.

Both methods have their advantages and disadvantages. The first method provides better accuracy and maneuverability, at the expense of large displacements for large cursor movements. The second method reduces displacement of the input device, thus reducing user input and fatigue and also reduces the size of the input device. However, the second method is subject to overshooting the destination position.

A joystick type control device is described in U.S. Pat. No. 4,148,014, and a three-dimension mouse is described in U.S. Pat. No. 5,784,052. A convertible mouse-trackball pointer is described in U.S. Pat. No. 5,726,684. Combined mouse and trackball devices are described in U.S. Pat. No. 5,063,289 and 5,280,276. A combined touch-pad mouse is described in U.S. Pat. No. 5,880,717. All of these devices have the disadvantages as described above.

Therefore, it is desired to provide a method and apparatus which yields accurate cursor movement with relatively small displacement of the input device.

SUMMARY OF THE INVENTION

The invention provides a method and apparatus for controlling both coarse and fine cursor movement on a display screen. In one embodiment, a controller is configured to control a cursor direction and a cursor speed, and a second controller is configured to control a cursor x-y position. The first controller is used for fast and coarse movement of the cursor, and the second controller is used for slow and fine movement of the cursor after the approximate desired position is reached using the first controller. The second controller can be mounted on the first.

In one embodiment, the first controller is a joystick, and the second controller is a trackball mounted at the end of the joystick. In another embodiment, the first controller is a mouse, and the second controller is a trackball mounted on a top surface of the mouse.

A switch can be used to select between coarse and fine movement. By using a switch, accidental movement of one or the other controller can be suppressed. For example, a switch on the joystick in the first embodiment can disable the sensing of any spurious joystick movement when fine cursor movement is desired.

In a third embodiment, a mouse is used, and one of the mouse buttons selects whether the mouse is operating in coarse or fine movement mode. In the fine mode, the mouse behaves as a conventional computer mouse. In the coarse mode, the mouse displacement, and the direction of displacement from the last position determine the velocity of the cursor movement.

BRIEF DESCRIPTION OF THE DRAWINGS

FIG. 2 is a schematic of corresponding displacement of the device of

FIG. 1; and

DETAILED DESCRIPTION OF THE PREFERRED EMBODIMENT

Figure 1:
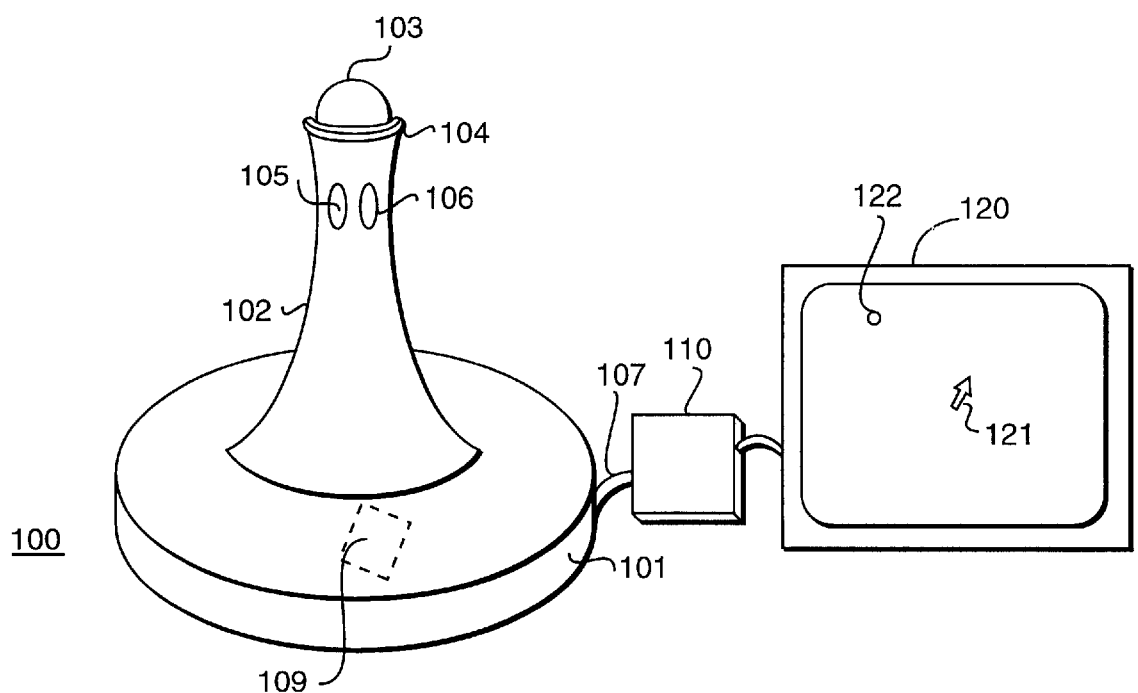
FIG. 1 is a diagrammatic of an input device according to the invention.

FIG. 1 shows a preferred embodiment of an input device 100 according to the present invention. The device 100 includes a base 101. An upwardly projecting handle 102 is mounted on the base. A trackball 103 is mounted on the handle, for example, at a distal end 104 from the base. The handle can also include other control buttons, for example, right and left control or "click" buttons 105–106. The device 100 can be connected via a cable 107 to an input port of a processor 110. An output port of the processor can be connected to a display monitor 120 including a cursor 121. Alternatively, the connections can be wireless, e.g., via infra-red transceivers. A switch 109 mounted in the base is activated when the joystick is moved to select coarse or fine cursor movement mode.

Figure 2:
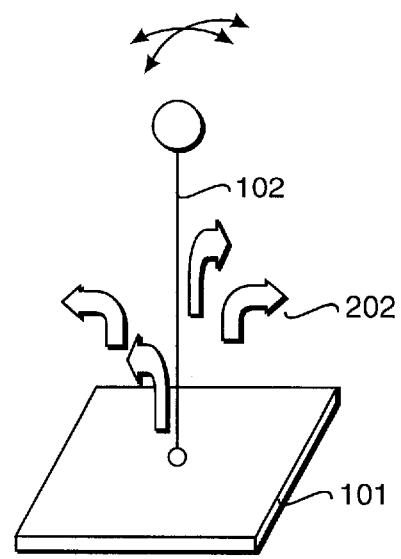

To operate the device 100 as shown in FIG. 2, the user tilts the handle 102 in a direction in which the cursor 121 needs to be moved on the display monitor 120 to reach a desired location 122 having x-y coordinates. The tilt larger than some prescribed threshold indicates that the user switched the controller into coarse mode. The magnitude of the angle 202 of tilt, from vertical, controls the speed at which the cursor moves. For example, small angles result in slow movement, and large angles result in fast movement. While the cursor is moving, the displacement of the handle can be adjusted to cause a corresponding adjustment in the direction and speed of cursor movement. Returning the handle to the neutral (vertical) position stops cursor movement and signals the switching to the fine control mode. When the cursor 121 is close to the desired cursor location 122, the trackball 103 is used to make fine adjustments to a final x-y coordinates of the cursor. Moving the trackball moves the cursor in a directly corresponding manner. When the cursor reaches the desired location 122, the buttons 105–106 can be used to cause the processor to perform additional actions.

Figure 3:
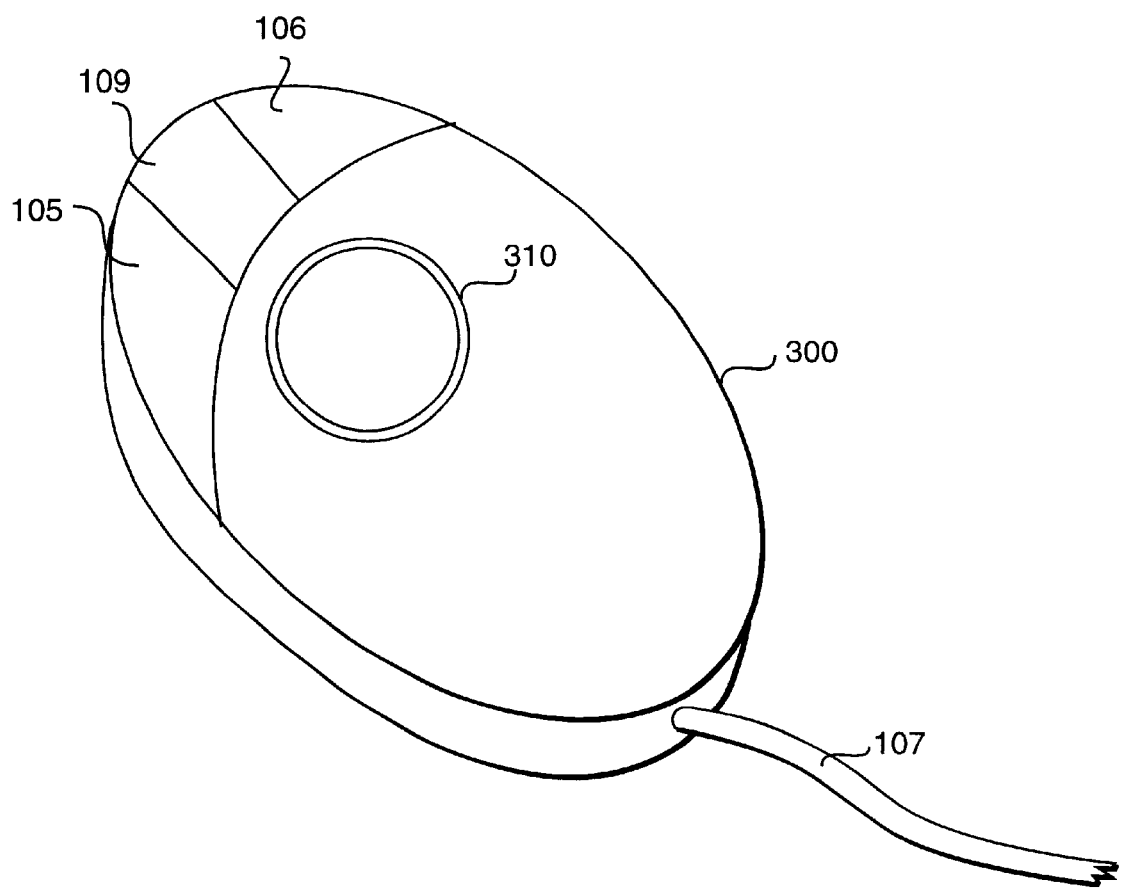
FIG. 3 is a diagrammatic of a combined mouse and trackball input device according to the invention.

FIG. 3 shows an alternative embodiment of the invention. In this case, a mouse controls the x-y position of the cursor, and a rotation of a trackball controls the speed and direction the cursor.

In another embodiment, a mouse does not contain the trackball 310. In this case, the switch 109 determines whether the mouse operates in the coarse or fine mode.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. A method for moving a cursor on a display screen, comprising the steps of:

moving a joystick to determine a cursor direction and a cursor speed on the display screen; and moving a trackball mounted on the joystick to determine a cursor x-y position on the display screen.

2. The method of claim 1 further comprising:

selecting the joystick to determine coarse cursor movement; and selecting the trackball to determine fine cursor movement.

3. The method of claim 1 wherein the trackball is mounted on the joystick.

4. The method of claim 2 wherein a switch selects the coarse and fine cursor movement.

5. An apparatus for moving a cursor on a display screen, comprising:

a joystick configured to control a cursor direction and a cursor speed; and a trackball mounted on the joystick configured to control a cursor x-y position.

6. The apparatus of claim 5 wherein the trackball is mounted on the joystick.

7. The apparatus of claim 5 wherein an angle of the joystick determines the direction of the cursor and a magnitude of the angle determines the speed of the cursor, and a rotation of the trackball determines the cursor x-y position.

* * * * *